(12) United States Patent
Sawaguchi

(10) Patent No.: US 8,274,697 B2
(45) Date of Patent: Sep. 25, 2012

(54) MULTIFUNCTION SYSTEM AND MULTIFUNCTION APPARATUS

(75) Inventor: Kenji Sawaguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 476 days.

(21) Appl. No.: 12/081,443

(22) Filed: Apr. 16, 2008

(65) Prior Publication Data

US 2008/0259388 A1 Oct. 23, 2008

(30) Foreign Application Priority Data

Apr. 20, 2007 (JP) ................................. 2007-112024

(51) Int. Cl.
*G06F 15/00* (2006.01)
(52) U.S. Cl. ........... 358/1.9; 358/1.15; 358/2.1; 399/80; 235/492
(58) Field of Classification Search .................. 358/1.15, 358/1.9, 2.1; 399/80; 235/492
See application file for complete search history.

(56) References Cited

U.S. PATENT DOCUMENTS 6,807,388 B1* 10/2004 Kojima et al. .................. 399/80
2002/0170973 A1* 11/2002 Teraura .......................... 235/492
2006/0045555 A1* 3/2006 Morimoto et al. ............... 399/80

FOREIGN PATENT DOCUMENTS

JP 02-029679 1/1990

* cited by examiner

*Primary Examiner* — Twyler Haskins
*Assistant Examiner* — Michael Burleson
(74) *Attorney, Agent, or Firm* — Rabin & Berdo, P.C.

(57) ABSTRACT

A multifunction system is provided that is capable of preventing unauthorized copying and the like of an image printed on a print material against the will of a user who has created the print material. The multifunction system includes: a printing apparatus having a printing unit printing on a prescribed recording medium a combined image formed by combining an image based on image information with an output-restriction image relating to restriction on output of the print material; and a reading apparatus having an image reading unit reading, responsive to a reading instruction, the combined image printed on the prescribed recording medium, an image analyzer unit analyzing the output-restriction image included in the combined image read out by the image reading unit, and an output determination unit determining, on the basis of an analyzed result generated by the image analyzer unit, as to whether the image based on the image information can be output.

11 Claims, 13 Drawing Sheets

| TYPE OF TAGS | TAG | HISTORY LIST OF OUTPUT DOCUMENTS | COPYING RESTRICTION INFORMATION |
|---|---|---|---|
| CONFIDENTIAL | △ | CONFIDENTIAL_1.doc<br>CONFIDENTIAL_2.doc | COPYING IS NOT PERMITTED |
| HIGHLY CONFIDENTIAL | ⬡ | H_CONF_1.doc | COPYING IS PERMITTED FROM 3 P.M. ON NOV. 6 TO 3 P.M. ON NOV. 9 CHANGE TAG ON 3 P.M. ON NOV. 10 |
| REGULAR DOCUMENT | ☆ | REGULAR_1.doc<br>REGULAR_2.doc | COPYING IS PERMITTED |

| TYPE OF TAGS | TAG | HISTORY LIST OF OUTPUT DOCUMENTS | COPYING RESTRICTION INFORMATION |
|---|---|---|---|
| CONFIDENTIAL | △ | CONFIDENTIAL_1.doc<br>CONFIDENTIAL_2.doc | COPYING IS NOT PERMITTED |
| HIGHLY CONFIDENTIAL | ⬡ | H_CONF_1.doc | COPYING IS PERMITTED FROM 3 P.M. ON NOV. 6 TO 3 P.M. ON NOV. 9<br>CHANGE TAG ON 3 P.M. ON NOV. 10 |
| REGULAR DOCUMENT | ☆ | REGULAR_1.doc<br>REGULAR_2.doc | COPYING IS PERMITTED |

FIG. 2

PRINT DOCUMENT

PLEASE SELECT A TAG FOR ATTACHING TO THE DOCUMENT.

| NAME OF TAGS | TAGS | HISTORY LIST OF OUTPUT DOCUMENTS | COPYING RESTRICTION INFORMATION |
|---|---|---|---|
| CONFIDENTIAL | △ | CONFIDENTIAL_1.doc<br>CONFIDENTIAL_2.doc | COPYING IS NOT PERMITTED |
| HIGHLY CONFIDENTIAL | ⬡ | H_CONF_1.doc | COPYING IS PERMITTED FROM 3 P.M. ON NOV. 6 TO 3 P.M. ON NOV. 9<br>CHANGE TAG ON 3 P.M. ON NOV. 10 |
| REGULAR DOCUMENT | ☆ | REGULAR_1.doc<br>REGULAR_2.doc | COPYING IS PERMITTED |

PRINT

FIG. 3

| NAME OF TAGS | TAG | NAME OF OUTPUT DOCUMENT | COPYING RESTRICTION INFORMATION | E-MAIL RESTRICTION INFORMATION | FACSIMILE RESTRICTION INFORMATION | STORING RESTRICTION INFORMATION |
|---|---|---|---|---|---|---|
| INTERNAL USE ONLY | △ | INT_ONLY_1.doc<br>INT_ONLY_2.doc | COPYING IS NOT PERMITTED | E-MAIL TRANSMISSION IS NOT PERMITTED | FACSIMILE TRANSMISSION IS NOT PERMITTED | STORING IS PERMITTED |
| CONFIDENTIAL | ⬡ | CONFIDENTIAL_1.doc | COPYING IS PERMITTED UNTIL 3 P.M. ON NOV. 8 | E-MAIL TRANSMISSION IS NOT PERMITTED | FACSIMILE TRANSMISSION IS NOT PERMITTED | STORING IS PERMITTED |
| REGULAR DOCUMENT | ☆ | REGULAR_1.doc<br>REGULAR_2.doc | COPYING IS PERMITTED | E-MAIL TRANSMISSION IS NOT PERMITTED | FACSIMILE TRANSMISSION IS NOT PERMITTED | STORING IS PERMITTED |

FIG. 10

MULTIFUNCTION SYSTEM AND MULTIFUNCTION APPARATUS

BACKGROUND OF THE INVENTION

1. Field of the Invention

The present invention relates to a multifunction system and a multifunction apparatus.

2. Description of Related Art

Conventional document protection technology disclosed in Japanese Patent Application Publication No. H2-29679 is known that restricts copying of confidential documents and the like printed on paper.

Specifically, Japanese Patent Application Publication No. H2-29679 discloses a copy-deterring sheet having a hidden warning message formed thereon by two types of minute dots, each of which have the same apparent density on the original of the copy-deterring sheet. However, when a user copies the copy-deterring sheet, copying process makes the difference in density between the two types of minute dots larger to render the two types of minute dots distinguishable from each other, so that the warning message formed by the two types of minute dots becomes readily visible on copies made of the copy-deterring sheet, thus deterring unauthorized copying.

Although the warning message appearing on the copies made of the copy-deterring sheet may somewhat deter the user from attempting to copy the copy-deterring sheet, the user can ultimately obtain the copies made of the copy-deterring sheet on which not only the warning message but also confidential information are printed. There raises a problem that the above-described conventional document protection technology merely gives the warning message to the user and cannot stop the user from obtaining copies made of print materials having confidential information and the like.

SUMMARY OF THE INVENTION

This invention is made to solve such problems, and it is the object of the present invention to provide a multifunction system and a multifunction apparatus preventing unauthorized copying and the like of an image printed on a print material against the will of the user who has created the print material.

To solve the above-described problems, the multifunction system according to the present invention includes: a printing apparatus having a printing unit printing on a prescribed recording medium a combined image formed by combining an image based on image information with an output-restriction image relating to restriction on output of a print material; and a reading apparatus having an image reading unit reading, responsive to a reading instruction, the combined image printed on the prescribed recording medium, an image analyzer unit analyzing the output-restriction image included in the combined image read out by the image reading unit, and an output determination unit determining, on the basis of an analyzed result generated by the image analyzer unit, as to whether the image based on the image information can be output.

The multifunction system configured as described-above prints the combined image formed by combining the image based on the image information with the output-restriction image relating to restriction on output of the print material. When the print material having the combined image printed thereon is attempted to be copied, the reading apparatus analyzes the output-restriction image included in the combined image to determine, on the basis of the analyzed result, as to whether the image can be output. Thus, the multifunction system can control whether to allow output on the basis of the output-restriction image.

The multifunction apparatus according to the present invention includes a printing unit printing on a prescribed recording medium a combined image formed by combining an image based on image information with an output-restriction image relating to restriction on output of a print material, an image reading unit reading, responsive to a reading instruction, the combined image printed on the prescribed recording medium, an image analyzer unit analyzing the output-restriction image included in the combined image read out by the image reading unit, and an output determination unit determining, on the basis of an analyzed result generated by the image analyzer unit, as to whether the image based on the image information can be output.

The multifunction apparatus configured as described-above prints the combined image formed by combining the image based on image information with the output-restriction image relating to restriction on output of the print material. When the print material is attempted to be copied, the multifunction apparatus analyzes the output-restriction image included in the combined image and determines, on the basis of the analyzed result, as to whether the image can be output. Thus, the multifunction apparatus can control whether to allow output on the basis of the output-restriction image.

As described above, the multifunction system and the multifunction apparatus of the present invention prevents unauthorized copying and the like of the image printed on the print material against the will of the user who has created the print material.

DETAILED DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein:

FIG. 2 is a diagram showing tag information used by the multifunction system according to the first embodiment of the present invention;

FIG. 3 is an example of screen displayed on a client PC included in multifunction system according to the first embodiment of the present invention;

FIG. 10 is a diagram showing tag information used by the multifunction system according to the second embodiment of the present invention;

PREFERRED EMBODIMENTS

The embodiments according to the present invention is hereinafter described in detail with reference to the figures.

First Embodiment

The multifunction system according to the first embodiment has a printing apparatus such as a printer and a reading apparatus such as an MFP (Multi Function Peripheral) having a scanning mechanism and a printing mechanism, and the printing apparatus and the reading apparatus are connected with each other. The multifunction system further has a server apparatus. The printing apparatus prints on a recording medium such as paper a combined image based on input image information and an output-restriction image corresponding to output-restriction information. The output-restriction information relates to whether copying is permitted and time period when copying is permitted. The output-restriction information is converted into the output-restriction image by the server apparatus, and is input to the printing apparatus upon being combined with the image information depending on criteria specified by a user. Then, the print apparatus receives the combined image formed with the image information to which the output-restriction information is added, and the combined image is extracted into a printable format and printed.

On the other hand, the reading apparatus reads an image printed by the printing apparatus to copy the image. When the user copies the image printed by the printing apparatus, the user places on the reading apparatus a print material having the combined image printed thereon. When the user enters a read instruction to the reading apparatus, the reading apparatus reads the combined image printed on the print material. Then, the reading apparatus analyzes the output-restriction image included in the combined image to determine whether copying is permitted. To determine whether copying is permitted, the reading apparatus transmits the analyzed result of the output-restriction image to the server apparatus. Then, the server apparatus looks up the output-restriction information corresponding to the output-restriction image to determine whether copying is permitted, and transmits information as to whether copying is permitted to the reading apparatus. The reading apparatus determines whether output is permitted based on the information as to whether copying is permitted transmitted from the server apparatus. Thus, the multifunction system can control whether to permit the print material to be copied based on the output-restriction image printed on the print martial, so that the multifunction system can prevent unauthorized copying of the print material. A specific example of such multifunction system is hereinafter described in detail.

Figure 1:
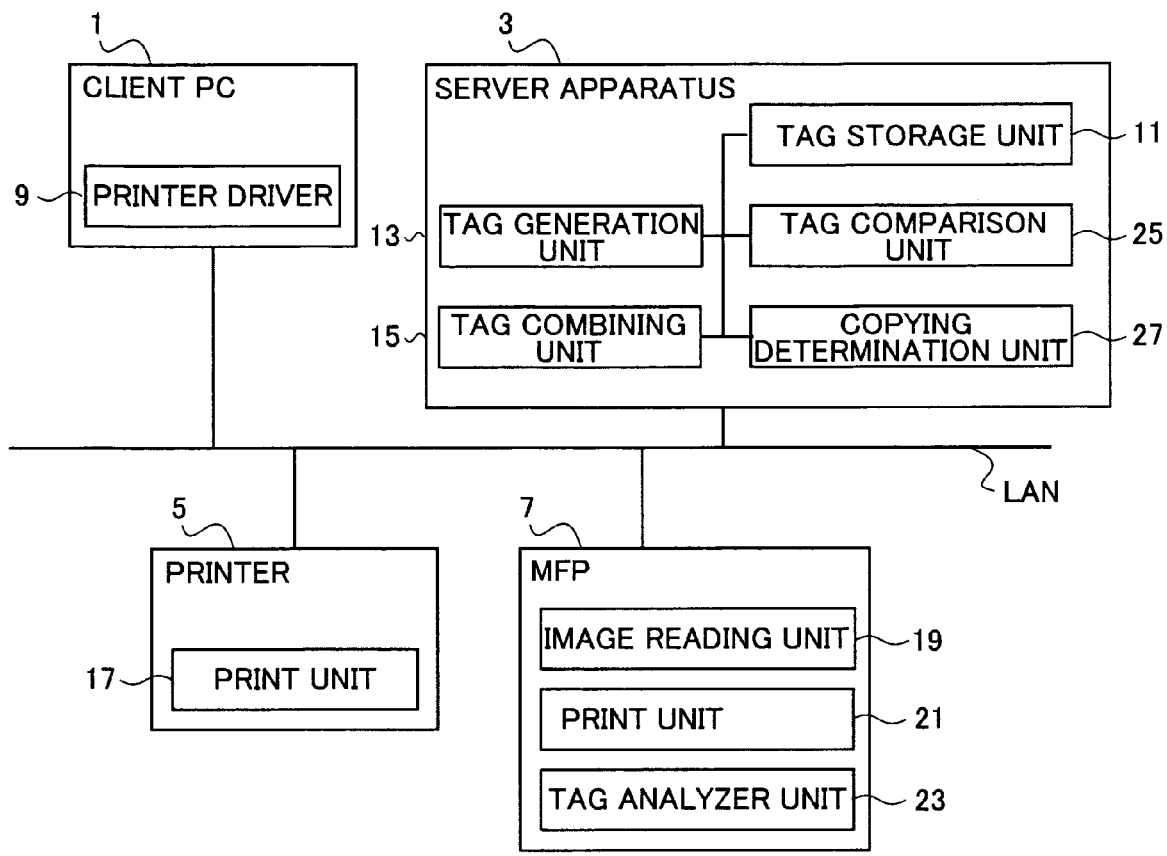
FIG. 1 is a block diagram showing a multifunction system according to the first embodiment of the present invention.

As shown in FIG. 1, the multifunction system according to the first embodiment has a client PC 1, the server apparatus 3, a printer 5 serving as the printing apparatus, and an MFP 7 serving as the multifunction apparatus, which are connected with each other over a LAN 9 (Local Area Network).

The user operates the client PC 1 to generate image information using a prescribed application program. When the user wants to print a document, i.e., the image information, the client PC 1 uses a printer driver 9 installed on the client PC 1 to access the server apparatus.

The server apparatus 3 has a tag storage unit 11 storing tags serving as the output-restriction images and copying restriction information serving as the output-restriction information, wherein each of the tags is related to the corresponding copying restriction information. Specifically, as shown in FIG. 2, the tag storage unit 11 stores tag information, and the tag information includes names of the tags, shapes of the tags, history lists of document filenames that are printed with the tags, and the copying restriction information. When the client PC 1 accesses the server apparatus 3 to request the tag information, the server apparatus 3 transmits data stored in the tag storage unit 11 to the client PC 1. Then, the client PC 1 displays on a display unit, not shown, a screen as shown in FIG. 3 depending on the received tag information. Thus, the client PC 1 displays to the user the names of the tags, the tags, and the copying restriction information of the tag information. When the user selects the tag that is to be attached to the image information from the tag information, the printer driver 9 transmits the image information and the selected tag to the server apparatus 3.

Then, the server apparatus 3 refers to the type of the tag, and uses a tag generation unit 13 to generate an image data corresponding to the specified tag. The tag generation unit 13 supplies the generated image data of the tag to a tag combining unit 15.

Figure 4:
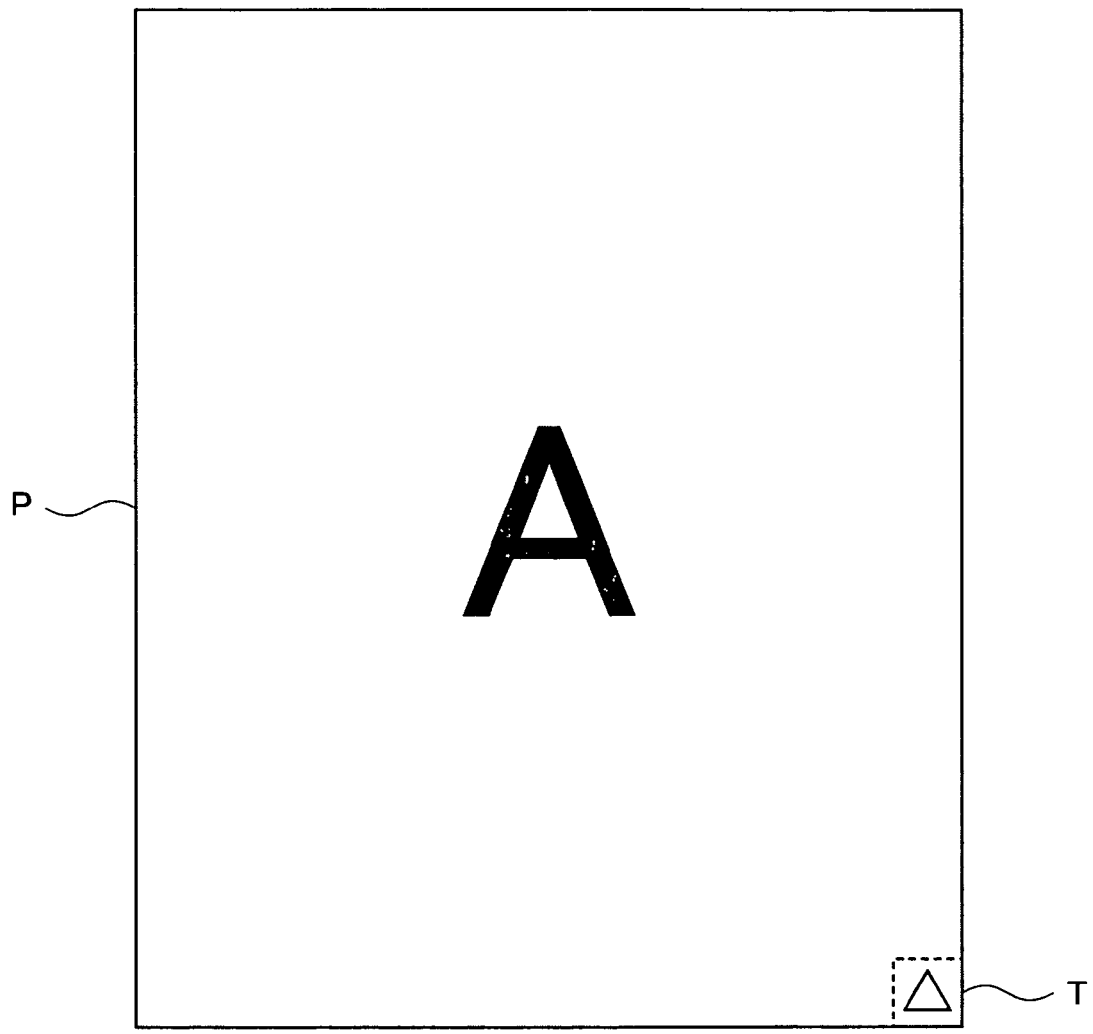
FIG. 4 is an example of print material printed by the multifunction system according to the first embodiment of the present invention.

The server apparatus 3 further has the tag combining unit 15 combining the generated image data of the tag and an image based on the image information. The tag combining unit 15 combines the image based on the image information and the image data of the tag to generate the combined image. As shown in FIG. 4, the tag T is arranged to be printed at an inconspicuous position such as a corner of a sheet P when an image based on the image data in printed on the sheet P. Then, the server apparatus 3 transmits the combined image to the printer 5.

The printer 5 has a print unit 17 printing the image based on the combined image received from the server apparatus. The print unit 17 prints on the sheet the image based on the combined image transmitted from the server apparatus 3 to provide the printed sheet to the user.

The MFP 7 has an image reading unit 19 reading the image printed on the sheet, a print unit 21 printing a copy of the read image, and a tag analyzer unit 23 analyzing an image of the read tag. The tag analyzer unit 23 extracts the image of the tag from read image to analyze the tag. Specifically, the tag analyzer unit 23 extracts an image existing in a preconfigured area of the image printed on the sheet as the tag. The tag analyzer unit 23 analyzes shape data of the image in the previously specified area based on, for example, coordinates of the two-dimensional rectangular coordinate system. Then, the MFP 7 transmits the analyzed shape data of the tag to the server apparatus 3 and requests the server apparatus 3 to determine as to whether copying is permitted.

The server apparatus 3 has a tag comparison unit 25 comparing the shape data of the tag received from the MFP 7 with the shape data of any one of the tags stored in the tag storage unit 11, and further has a copying determination unit 27 determining whether copying is permitted based on the comparison result of the tag comparison unit 25.

Figure 5:
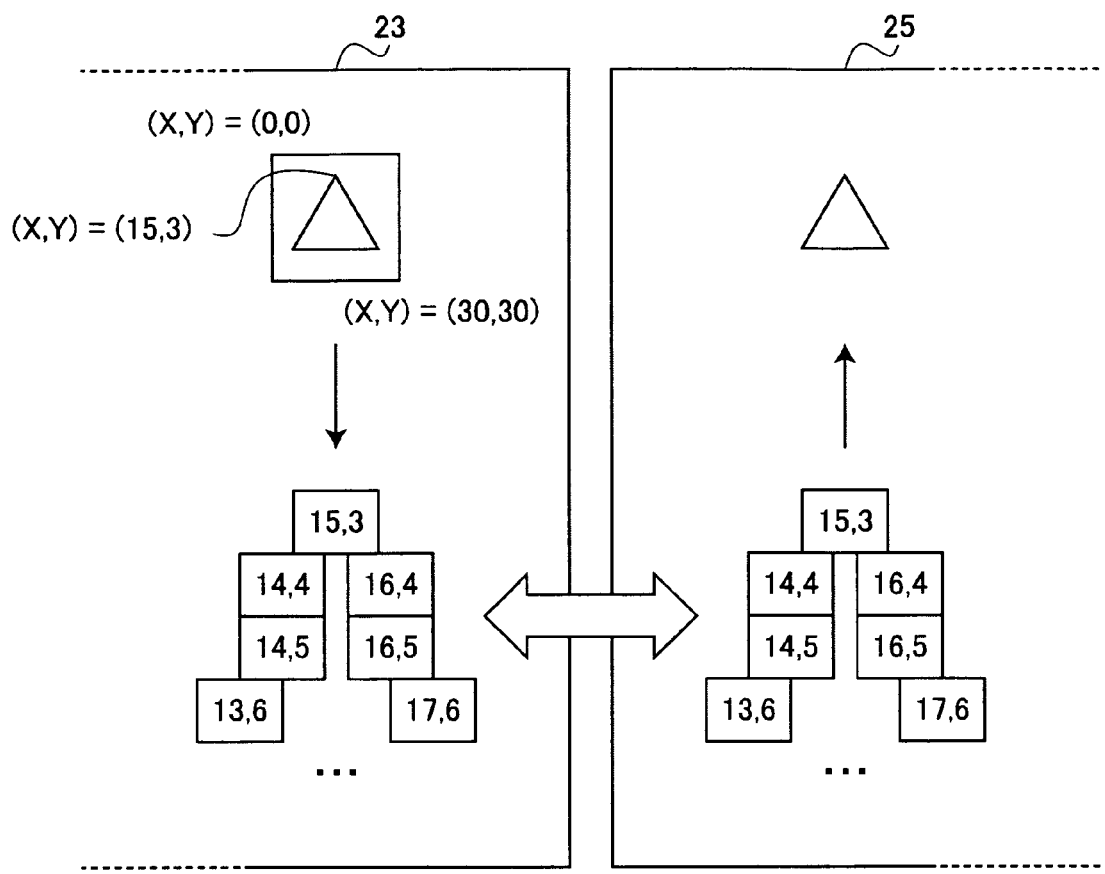
FIG. 5 is a diagram showing the tag to explain how the tag is analyzed.

For example, in a case where the tag read by the image reading unit 19 is in a shape of regular triangle, the tag analyzer unit 23 searches the previously specified area from upstream to downstream in reading direction of the image reading unit 19 for a first appearing dot and the coordinate of the first appearing dot. For example, suppose that the previously specified area is in the size of (X,Y)=(30,30) on the rectangular coordinate system as shown in FIG. 5. In this case, the tag analyzer unit 23 finds the coordinate of the dot (X,Y)=(15,3) that appears first in the previously specified area. Then, the tag analyzer 23 repeatedly perform such processing in series to find the coordinates of the dots, and transmits the coordinates as the shape data of the tag to tag comparison unit 25 in the server apparatus 3. Then, the tag comparison unit 25 in the server apparatus 3 receives the shape data of the tag, and compares the received shape data with the shape data stored in the tag storage unit 11 to find the shape data that agrees with the received shape data. Such comparison can be performed by setting the coordinate of the first appearing dot as a reference point, comparing the coordinates of the subsequent appearing dots using the reference point, and finding a rate of agreeing dots between the received shape data and the shape data stored in the tag storage unit 11. If the ratio of the agreeing dots is more than a certain ratio, the received shape data is determined to agree with the shape data in the tag storage unit 11 being compared. Upon finding the agreeing shape data, the tag comparison unit 25 reads out from the tag storage unit 11 the copying restriction information corresponding to the tag having the shape data that agrees with the received shape data. Then, the copying determination unit 27 determines whether copying is permitted based on the copying restriction information read by the tag comparison unit 25.

Operation is hereinafter described using an example shown in FIG. 2. For example, in a case where the tag read by the MFP 7 is in a shape of regular triangle, the copying determination unit 27 in the server apparatus 3 determines that copying is not permitted upon referring to the copying restriction information read by the tag comparison unit 25, and informs the MFP 7 of the result of determination. Alternatively, in a case where the tag read by the MFP 7 is in a shape of regular hexagon, the copying determination unit 27 in the server apparatus 3 obtains the current date and time from an operating system running on the server apparatus 3. The copying determination unit 27 then determines whether copying is permitted based on the obtained date and time and the copying restriction information, and informs the MFP 7 of the result of determination. If the copying restriction information includes an instruction to change the tag, the copying determination unit 27 changes the tag according to the instruction. Alternatively, in a case where the tag read by the MFP 7 is in a shape of star, the copying determination unit 27 refers to the copying restriction information read by the tag comparison unit 25 and determines that copying is permitted. The copying determination unit 27 informs the MFP 7 of the result of determination.

Then, the MFP 7 receives from the server apparatus 3 an instruction as to whether copying is permitted, and depending on the received instruction, the MFP 7 copies the image printed on the sheet or notifies the user that copying is not permitted.

Figure 6:
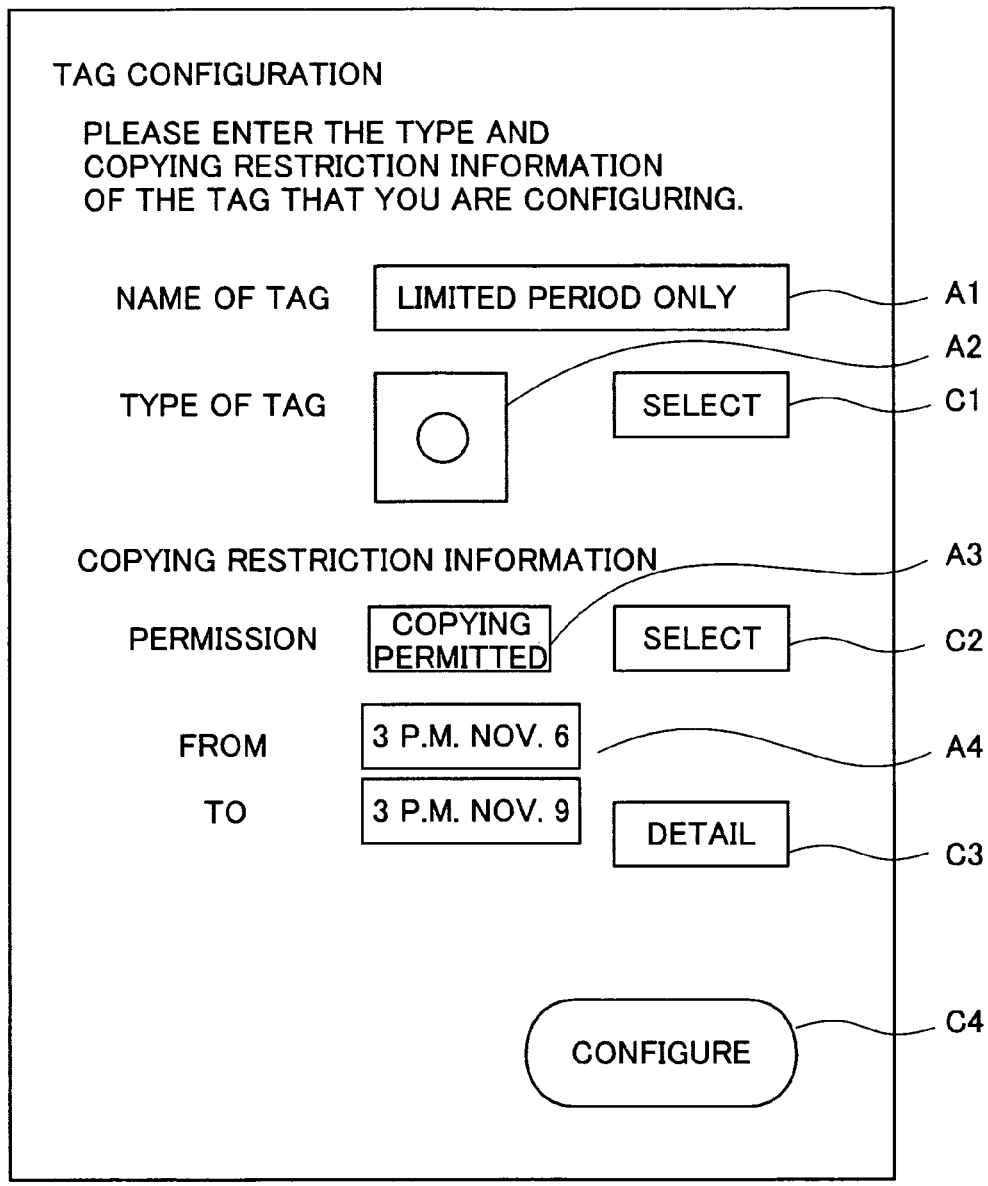
FIG. 6 is an example of screen displayed on a client PC included in the multifunction system according to the first embodiment of the present invention.

In the multifunction system as described above, the tag information is made by the user and stored in the tag storage unit 11 in the server apparatus 3. When the user makes the tag information, the client PC 1 displays on the display unit a screen as shown in FIG. 6. The screen shows a name input field A1 allowing input of the name of the tag, a tag display field A2 showing the tag that the user has selected by clicking a selection button C1, a copying permission display field A3 showing whether copying is permitted or prohibited that the user has selected by clicking a selection button C2, and a condition display field A4 showing a detailed condition of the copying restriction information that the user has selected by clicking a selection button C3. When the user enters prescribed information in each of the fields and clicks a configuration button C4, the configured tag information is transmitted to the server apparatus 3 and stored in the tag storage unit 11 in the server apparatus 3.

As shown in FIG. 2, each tag in the tag storage unit 11 includes the history list showing a list of filenames of documents to which the tag has been attached. When the user selects the tag and prints a document with the selected tag, the filename of the printed document is added to the history list of the selected tag in the tag storage unit 11. When the user later prints a document and is prompted to select the tag that is to be printed with the document, the history lists are displayed besides each of the tags to show what documents have been printed with which tags, and thus, the history lists help the user select the tag appropriate for the document that the user is going to print.

Operation of the multifunction system having the above structure is hereinafter described in detail.

Figure 7:
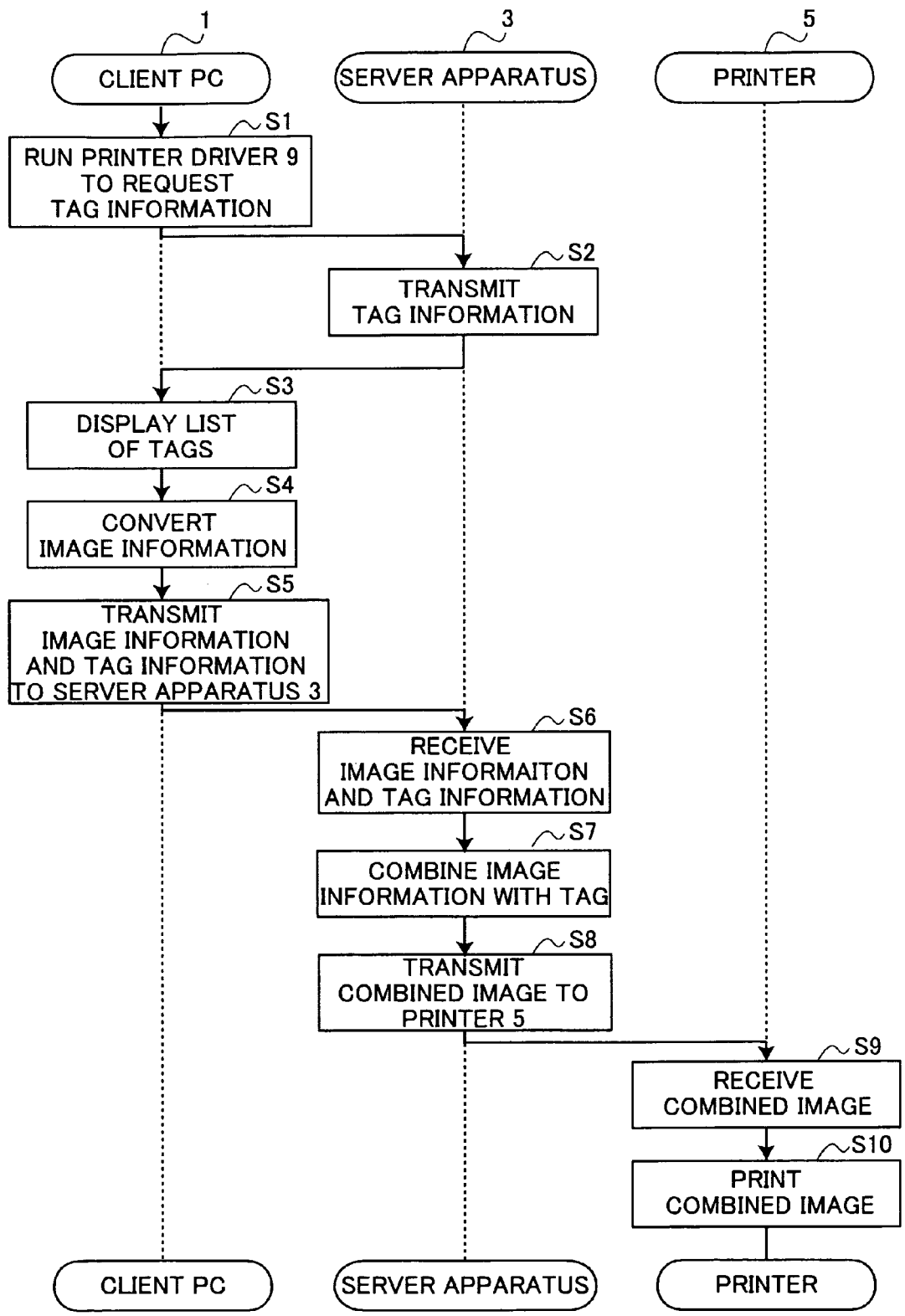
FIG. 7 is a flowchart showing operation of the multifunction system according to the first embodiment of the present invention.

First, operation of the multifunction system is hereinafter described in detail with reference to FIG. 7 when the printer 5 prints an image generated by the client PC 1.

When the user initiates a series of steps by entering to the client PC 1 an instruction to print the image created by the user, the client PC 1 runs the printer driver 9 to request the server apparatus 3 for the tag information at step S1. Specifically, when the printer driver 9 runs, the printer driver 9 accesses the server apparatus 3 over the LAN to request the tag information. In response, the server apparatus 3 reads the tag information from the tag storage unit 11 to transmit the tag information to the client PC 1 at step S2. Thus, the client PC 1 can show to the user the tag information that is to be attached to the image information.

Subsequently, the client PC 1 displays the received tag information on the display unit, not shown, at step S3. At this moment, the client PC 1 displays on the display unit a screen as shown in FIG. 3. In this way, the client PC 1 allows the user to select the tag information that is to be attached to the image information.

Then, the client PC 1 converts the image information of the image created by the user at step S4. Specifically, the printer driver 9 converts the image created by the user with an application program into the image information in a format recognizable by the printer 5. Then, the client PC 1 transmits to the server apparatus 3 the image information and the tag information selected by the user at step S5. Then, the server apparatus 3 receives the image information and the tag information selected by the user at step S6.

Then, the server apparatus 3 combines the image information and the tag at step S7. Specifically, the tag generation unit 13 refers to the tag information specified by the user and generates the shape data of the specified tag. Then, the tag combining unit 15 combines the generated shape data of the tag with the image information to form the combined image. Thereafter, the server apparatus 3 transmits the combined image to the printer 5 at step S8. The printer 5 receives the combined image at step S9.

Then, the printer prints an image based on the combined image on a sheet of paper at step S10, and terminuses this series of steps. In this way, the multifunction system can provide the user with the print material on which the image combined with the tag is printed.

Figure 8:
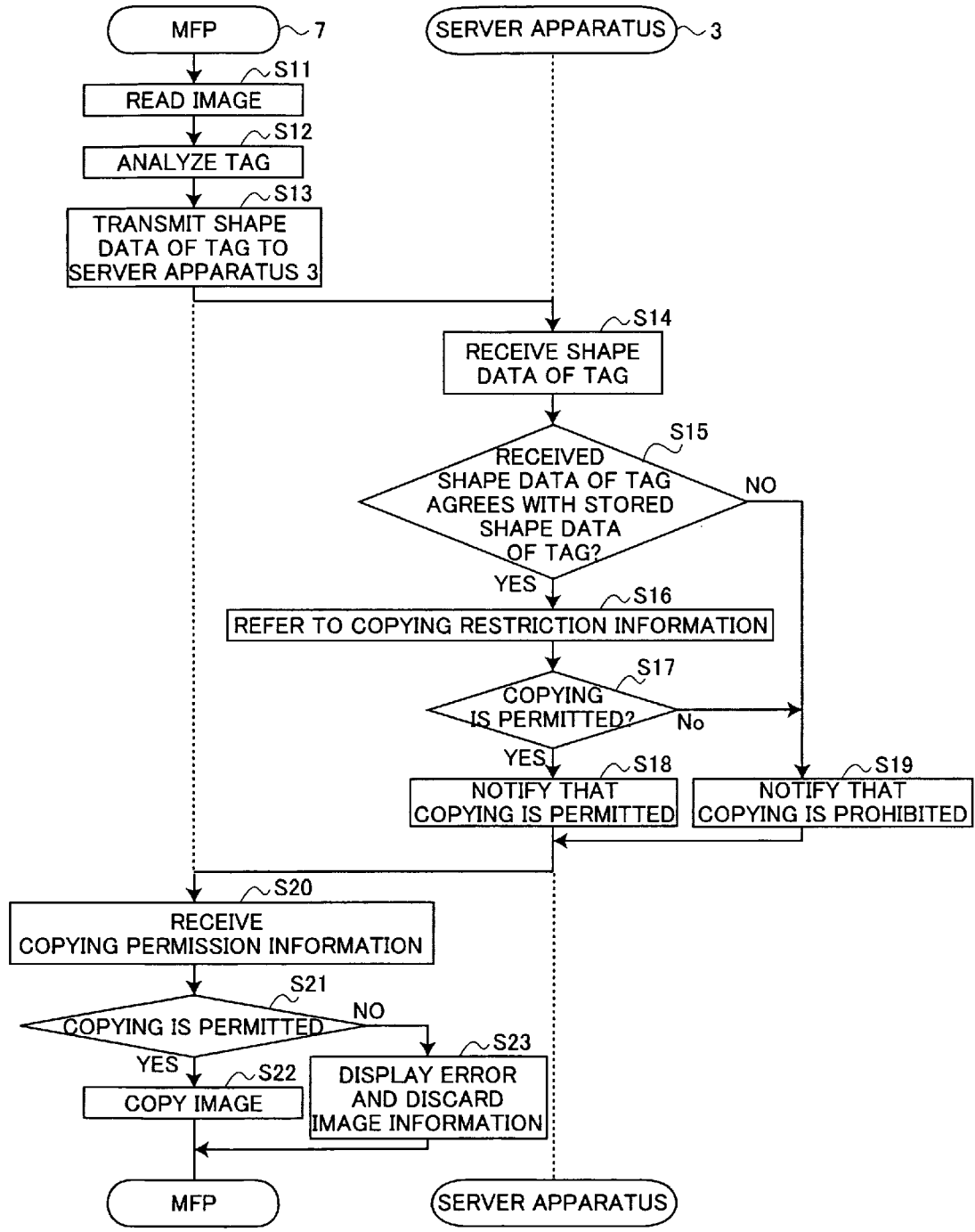
FIG. 8 is a flowchart showing operation of the multifunction system according to the first embodiment of the present invention.

Operation of the multifunction system is hereinafter described in detail with reference to FIG. 8 when the print material is copied.

The user places the print material on the reading unit, now shown, of the MFP 7, and enters the reading instruction to the MFP 7 to start a series of steps. The MFP 7 reads the image printed on the print material at step S11. Specifically, the image reading unit 19 scans the placed print material.

Next, the MFP 7 analyzes the tag at step S12. Specifically, the tag analyzer unit 23 extracts the image in the previously specified area of the combined image as the tag. The tag analyzer 23 generates the shape data of the tag according to the method as described above, and the MFP 7 transmits the generated shape data of the tag to the server apparatus 3 at step S13

The server apparatus 3 receives the shape data of the tag at step S14. Thereafter, the server apparatus 3 determines whether the received shape data of the tag agrees with any one of the shape data of the tags in the tag information stored in the tag storage unit 11 at step S15. Specifically, in the determination step, the tag comparison unit 25 compares the received shape data with each of the shape data in the tag storage unit 11 to find the stored shape data agreeing with the received shape data. Where the stored shape data agreeing with the received shape data is found, the copying determination unit 25 refers to the copying restriction information of the stored tag whose shape data agrees with the received shape data at step S16. The copying determination unit 27 analyzes the copying restriction information and determines whether copying is permitted at step S17. At this moment, where the server apparatus 3 determines that copying is permitted, the server apparatus 3 notifies the MFP 7 of copying permission information stating that copying is permitted at step S18. On the other hand, where the server apparatus 3 determines that copying is prohibited, the server apparatus 3 notifies the MFP 7 of the copying permission information stating that copying is prohibited at step S19.

At step S20, the MFP 7 receives the copying permission information. At step S21, the MFP 7 analyzes the copying permission information and determines whether copying is permitted. Where copying is permitted, the MFP 7 copies the print material to print an image based on the image read out of the print material including the tag at step S22, and terminates this series of steps. On the other hand, where copying is prohibited, the MFP 7 notifies the user of an error and discards the image information having been read at step S23, and terminates this series of steps.

In the multifunction system as hereinabove described, the printing apparatus 5 refers to the tag information stored in the server apparatus 3, and prints the combined image formed by combining the tag retrieved from the server apparatus 3 and the image created by the user. Then, when the user attempts to copy the print material having the combined image printed thereon, the reading apparatus 7 determines whether copying is permitted based on the tag printed on the print material and the tag information stored in the server apparatus 3 that the printing apparatus 5 referred to during printing. Thus, the print material is copied according to the copying restriction information of the tag specified by the user during printing, and the multifunction system does not allow unauthorized copying of the print material to which the user has attached the tag prohibiting copying during printing.

The tag information is rewritable in the multifunction system, so that the tag information can be flexibly generated according to the purposes of each user.

In the first embodiment, an application of the present invention to the multifunction system is described in detail. However, the present invention is not limited the multifunction system, and can also be applied to the multifunction apparatus such as a single MFP and the like. In such a case, the multifunction apparatus is connected to the client PC 1 over the LAN, and the print material is printed by a print unit arranged within the multifunction apparatus, unlike the first embodiment in which the print material is printed by the printer 5. Further, the multifunction apparatus has functions of the server apparatus 3 within the multifunction apparatus. Thus, the multifunction apparatus described herein does not allow unauthorized copying of the print material, just like the multifunction system of the first embodiment.

The second embodiment of the present invention is hereinafter described in detail. The second embodiment is similar to the first embodiment in some aspects, and the description thereabout is omitted. Only the differences of the second embodiment from the first embodiment are hereinafter described in detail.

Specifically, in addition to the advantageous effects of the first embodiment, the multifunction apparatus according to the second embodiment is advantageous in capable of adding the tag to the print material even where the multifunction apparatus copies the print material to which the tag has not yet been attached. The multifunction apparatus according to the second embodiment not only restricts copying of the print material but also restricts handling of the image information. Thus, the multifunction apparatus can restrict copying of documents without the tag such as handwritten documents and the like, and can prevent the image information itself from leaking to the outside.

Figure 9:
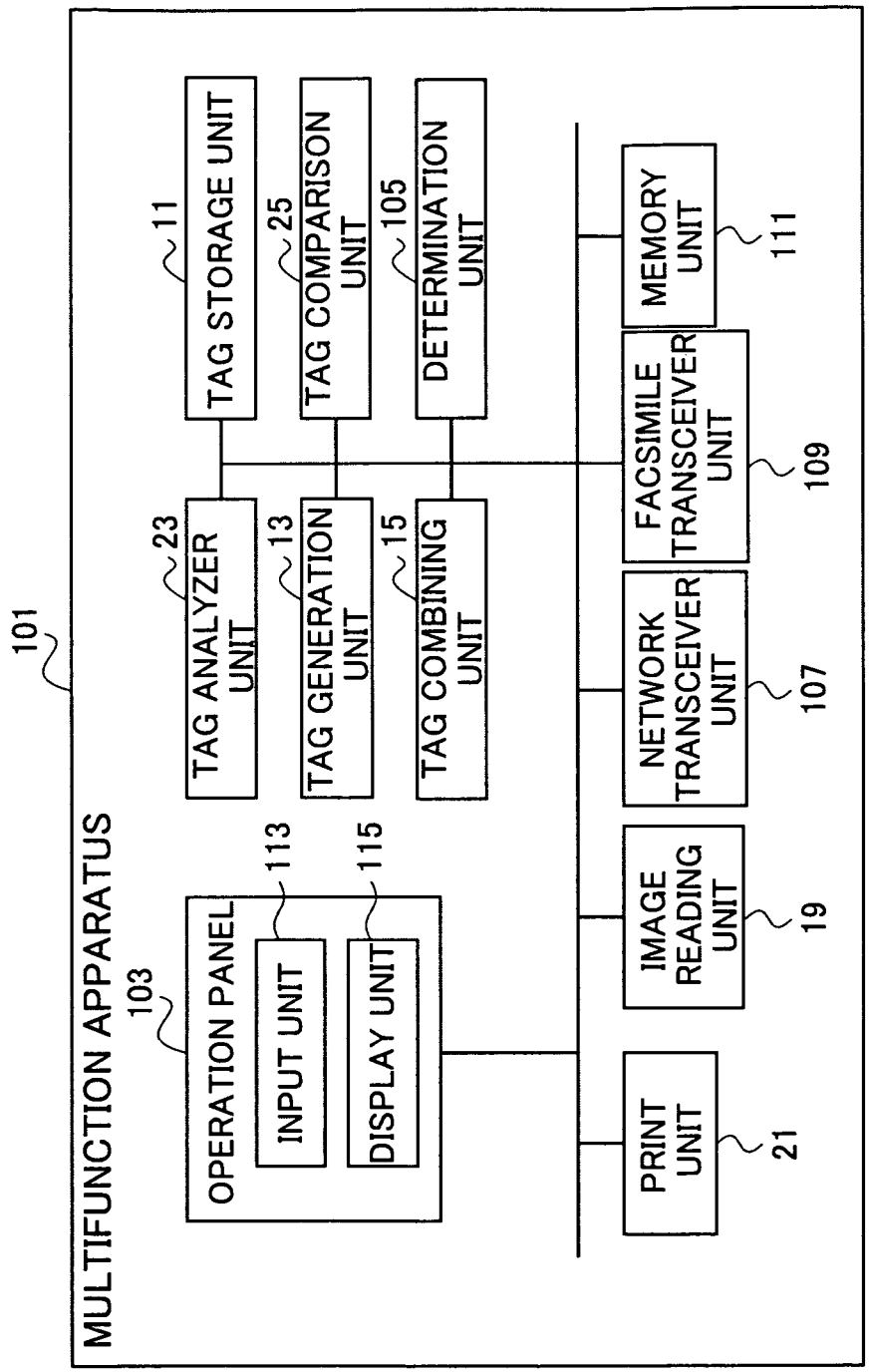
FIG. 9 is a block diagram showing a multifunction system according to the second embodiment of the present invention.

As shown in FIG. 9, a multifunction apparatus 101 has an operation panel 103 that the user manipulates to perform various operations, the tag storage unit 11, the tag generation unit 13, the tag combining unit 15, the tag analyzer unit 23, the tag comparison unit 25, the copying determination unit 27, the print unit 21, the reading unit 19, and a determination unit 105 making determination as to whether copying is permitted and the like, a network transceiver unit 107 transmitting and receiving information via the network, a facsimile transceiver unit 109 receiving and transmitting facsimiles, and a memory unit memorizing the input image information. The multifunction apparatus 101 copies an image on the print material read by the image reading unit 19 upon combining the read image with the tag selected by the user on operation panel 103. When the multifunction apparatus 101 copies again a copy of the print material made as described above, the multifunction apparatus 101 analyzes the tag attached to the copy of the print material to determine whether copying of the copy of the print material is permitted. The multifunction apparatus 101 analyzes the tag attached to the copy of the print material when the copy of the print material is read, thereby determining whether the image information of the copy of the print material is permitted to transmit to the outside and whether the image information is permitted to be stored.

The operation panel 103 has an input unit 113 allowing the user to enter various instructions to the multifunction apparatus 101 and a display unit 115 displaying various information to the user. The user uses the operation panel 103 to select the tag that is to be attached to the copy of the print material. Specifically, the operation panel 103 reads out the tag information stored in the tag storage unit 11 according to the user's instructions and displays the tag information on the display unit 115. Then, the user selects the tag that is to be attached to the copy of the print material, and information about the user's selection entered to the operation panel 103 is supplied to the tag generation unit 13.

The operation panel 103 also allows the user to enter the handling information about the image or the image information, and supplies the handling information to the determination unit 105. It should be noted that handling of the image or the image information means copying of the image, transmission of the image information to the outside, and storing of the image information. Then, the determination unit 105 refers to the tag information and the handling information about the image and the image information supplied by the operation panel 103 to determine as to whether copying of the image is permitted, whether transmission of the image information is permitted, and whether storing of the image information is permitted.

Further, the user enters an administrator password identifying the user to the operation panel 103.

The tag generation unit 13 generates the image data of the tag based on information supplied from the operation panel 103, and supplies the image data to the tag combining unit 15. The tag combining unit 15 combines the supplied image data with the image information of the image read by the image reading unit 19, and supplies the combined image to the print unit 21.

The determination unit 105 refers to the tag information, the analyzed result supplied by the tag analyzer unit 23, and the handling information about the image and the image information supplied by the operation panel 103 to determine as to whether copying of the image is permitted, whether transmission of the image information is permitted, and whether storing of the image information is permitted.

FIG. 10 shows information included in the tag information that the determination unit 105 reads out of the tag storage unit 11. Specifically, the tag information used by the multifunction apparatus 101 includes e-mail restriction information, facsimile restriction information and storing restriction information in addition to the tag information described in the first embodiment. The determination unit 105 determines as to: whether copying of the image is permitted; whether facsimile or e-mail transmission of the image information is permitted; and whether storing of the image information is permitted, based on: the tag information read out of the tag storage unit 11; the analyzed result supplied by the tag analyzer unit 23; and the handling information of the image or the image information that the user enters to the operation panel 103. For example, in a case where the user places the print material on the image reading unit 19 and enters to the operation panel 103 an instruction to transmit the image of the print material via e-mail, the determination unit 105 refers to the e-mail restriction information of the tag attached to the print material to determine whether e-mail transmission of the image information on the print material is permitted. In a case where the user enters to the operation panel 103 an instruction to transmit the image via facsimile, the determination unit 105 refers to the facsimile restriction information of the tag attached to the print material to determine whether facsimile transmission of the image information on the print material is permitted. In a case where the user enterts to the operation panel 103 an instruction to store the image in the memory unit 111, the determination unit 105 refers to the storing restriction information of the tag attached to the print material to determine whether the image information on the print material is permitted to be stored in the memory unit 111.

Operation of the multifunction apparatus 101 is hereinafter described in detail.

Figure 11:
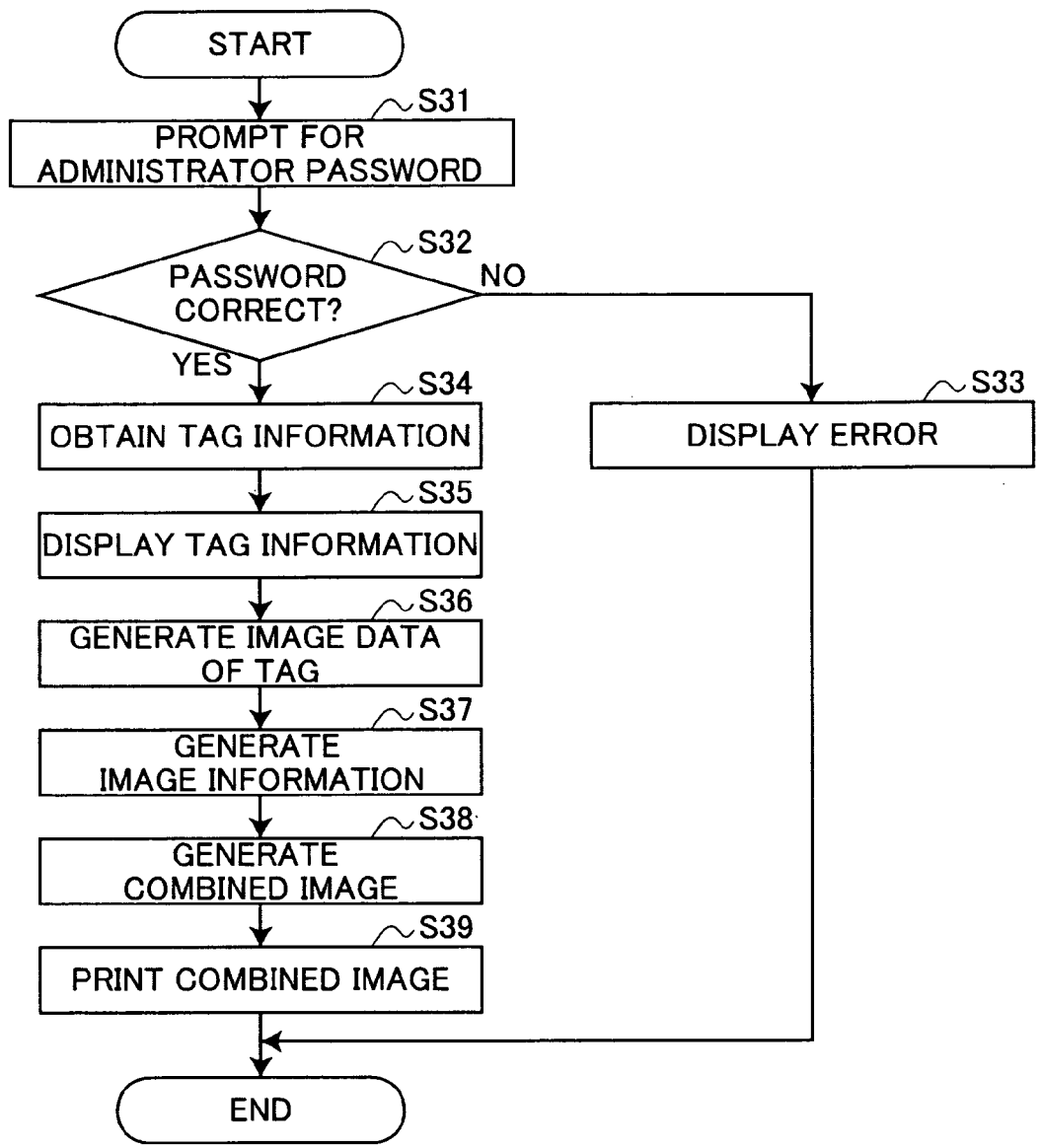
FIG. 11 is a flowchart showing operation of the multifunction system according to the second embodiment of the present invention.

First, a series of steps of the multifunction apparatus 101 is described in detail with reference to FIG. 11 when the user selects and attaches the tag to the print material.

When the user places the print material on the image reading unit 19 and inputs the image reading instruction to start a series of steps, the multifunction apparatus 101 prompts the user to input the administrator password at step S31. The multifunction apparatus 101 determines whether the administrator password entered by the user is correct at step S32. Where the entered administrator password is determined to be incorrect, the multifunction apparatus 101 displays an error on the display unit 115 at step S33 and terminates this series of steps. On the other hand, where the input administrator password is determined to be correct, the multifunction apparatus 101 performs step S34 and subsequent steps to read the image.

The multifunction apparatus 101 obtains the tag information from the tag storage unit 11 at step S34. The multifunction apparatus 101 displays the obtained tag information on the display unit 115 at step S35. Thus, the user can see and select the tag information to select the tag.

When the user refers to the tag information and selects the tag that is to be attached, the tag generation unit 13 in the multifunction apparatus 101 generates the image data of the tag that is to be attached at step S36. The tag generation unit 13 supplies the generated image data to the tag combining unit 15.

The multifunction apparatus 101 reads the placed print material, and generates the image information based on the read image at step S37. Then, the generated image information is supplied to the tag combining unit 15.

Next, the tag combining unit 15 in the multifunction apparatus 101 combines the image information and the tag to form the combined image at step S37. The combined image is supplied to the print unit 21. The multifunction apparatus 101 prints an image based on the combined image on a sheet of paper at step S39, and supplies the printed sheet to the user.

Figure 12:
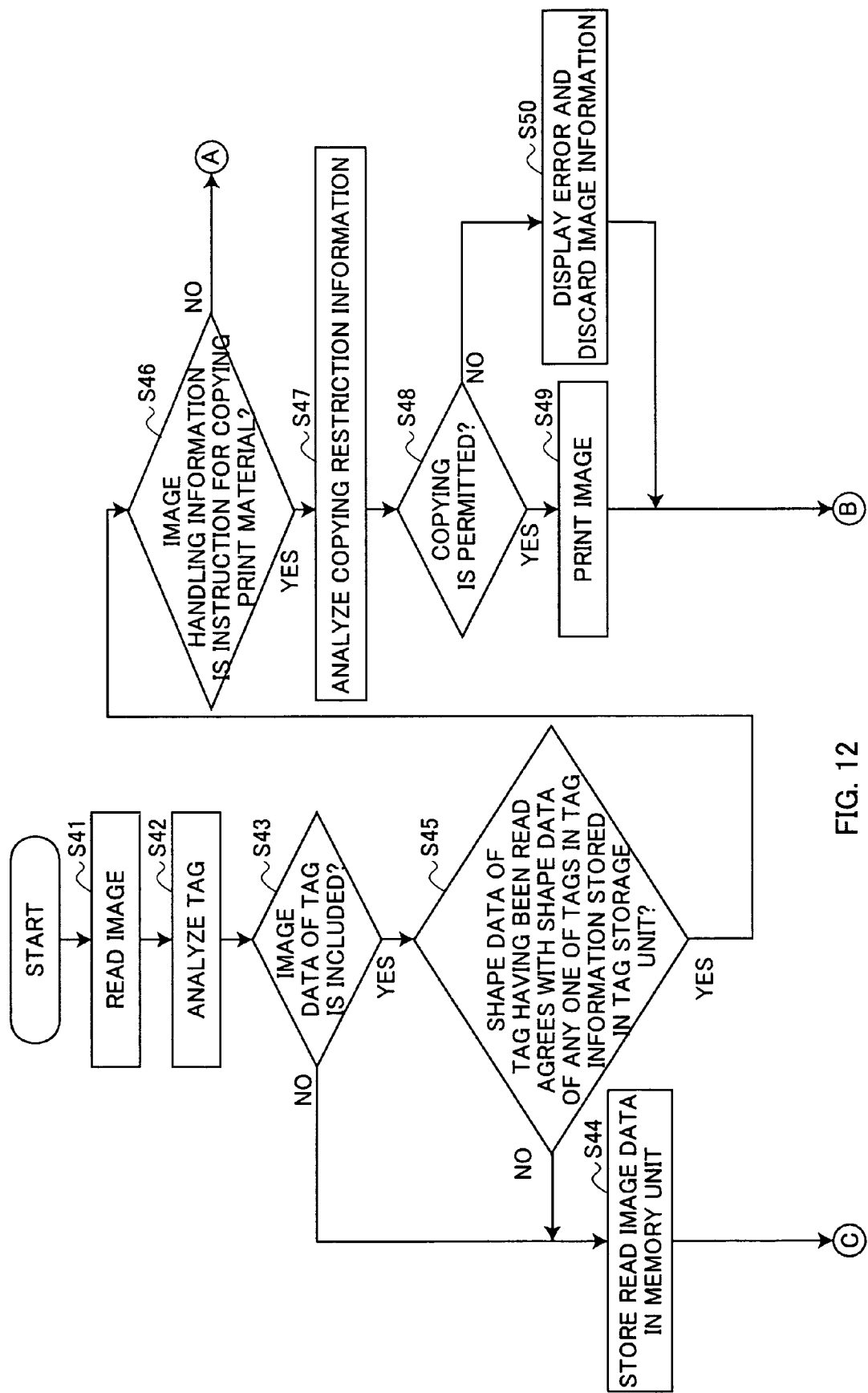
FIG. 12 is a flowchart showing operation of the multifunction system according to the second embodiment of the present invention.
Figure 13:
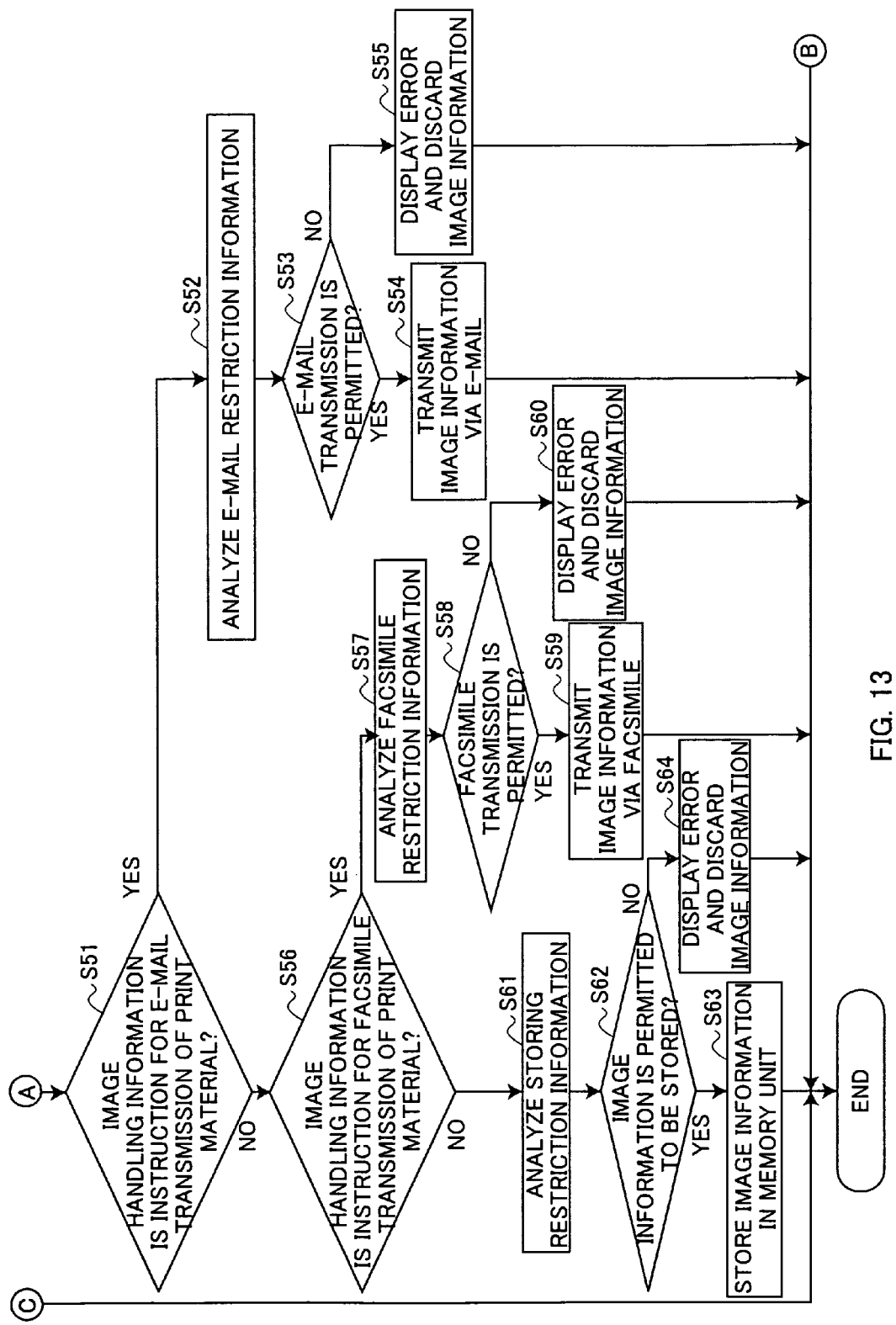
FIG. 13 is a flowchart showing operation of the multifunction system according to the second embodiment of the present invention.

Operation of the multifunction apparatus 101 is hereinafter described in detail with reference to FIGS. 12 and 13 when the user attempts to copy, transmit to the outside, or store the print material copied by the multifunction apparatus 101.

When the user places the print material on the image reading unit 19 to initiate a series of steps, the reading unit 19 in the multifunction apparatus 101 reads an image of the print material at step S41, and then, the tag analyzer unit 23 in the multifunction apparatus 101 analyzes the tag at step S42. The tag analyzer 23 in the multifunction apparatus 101 determines whether the image data of the tag is included in the image information read out of the print material at step S43. Then, where the image data of the tag is determined not to be included therein, the multifunction apparatus 101 stores the read information in the memory unit 111 and adds a new record to the tag storage unit 11 at step S44, and terminates this series of steps.

On the other hand, where the image data of the tag is determined to be included therein, the tag comparison unit 25 in the multifunction apparatus 101 compares the shape data of the read tag with the shape data of the tags in the tag information stored in the tag storage unit 11 to find if there is the shape data in the tag storage unit 11 agreeing with the shape data of the read tag at step S45. Where there is no shape data in the tag storage unit 11 agreeing with the shape data of the read tag, the tag comparison unit 25 performs step S44 and terminates this series of steps. On the other hand, where there is the shape data in the tag storage unit 11 agreeing with the shape data of the read tag, the comparison unit 25 performs steps S46 and subsequent steps.

The multifunction apparatus 101 analyzes the image handling information entered by the user to the operation panel 103, and determines whether the image handling information is an instruction for copying the print material. Where the image handling information is the instruction for copying the print material, the multifunction apparatus 101 makes the determination unit 105 refer to and analyze the copying restriction information at step S47, and determines whether copying is permitted at step S48. Where the multifunction apparatus 101 determines that copying of the print material is permitted as a result of determination at step S48, the multifunction apparatus 101 prints the read image together with the tag included in the read image on a sheet of paper at step S49, and terminates this series of steps. On the other hand, where copying of the print material is not permitted, the multifunction apparatus 101 notifies the user of an error and discards the image information of the read image at step S50, and terminates this series of steps.

Where the image handling information is determined not to be the instruction for copying the print material at step S46, the multifunction apparatus 101 analyzes the image handling information entered by the user to the operation panel 103, and determines whether the image handling information is an instruction for e-mail transmission of the print material at step S51. Where the image handling information is the instruction for e-mail transmission of the print material, the multifunction apparatus 101 makes the determination unit 105 refer to and analyze the e-mail restriction information at step S52, and determines whether e-mail transmission is permitted at step S53. Where the multifunction apparatus 101 determines that e-mail transmission of the print material is permitted as a result of determination at step S53, the multifunction apparatus 101 transmits the read image together with the tag included in the read image at step S54, and terminates this series of steps. On the other hand, where e-mail transmission of the print material is not permitted, the multifunction apparatus 101 notifies the user of an error and discards the image information of the read image at step S55, and terminates this series of steps.

Where the image handling information is determined not to be the instruction for e-mail transmission of the print material at step S51, the multifunction apparatus 101 analyzes the image handling information entered by the user to the operation panel 103, and determines whether the image handling information is an instruction for facsimile transmission of the print material at step S56. Where the image handling information is the instruction for facsimile transmission of the print material, the multifunction apparatus 101 makes the determination unit 105 refer to and analyze the facsimile restriction information at step S57, and determines whether facsimile transmission is permitted at step S58. Where the multifunction apparatus 101 determines that facsimile transmission of the print material is permitted as a result of determination at step S58, the multifunction apparatus 101 transmits the read image together with the tag included in the read image at step S59, and terminates this series of steps. On the other hand, where facsimile transmission of the print material is not permitted, the multifunction apparatus 101 notifies the user of an error and discards the image information of the read image at step S60, and terminates this series of steps.

Where the image handling information is determined not to be the instruction for facsimile transmission of the print material at step S56, the multifunction apparatus 101 determines that the image handling information is an instruction for storing the print material in the memory unit 111, and performs step S61 and subsequent steps.

The multifunction apparatus 101 makes the determination unit 105 refer to and analyze the storing restriction information at step S61, and determines whether facsimile transmission is permitted at step S62. Where the multifunction apparatus 101 determines that storing of the print material is permitted as a result of determination at step S62, the multifunction apparatus 101 stores in the memory unit 111 the read image together with the tag included in the read image at step S63, and terminates this series of steps. On the other hand, where storing of the print material is not permitted, the multifunction apparatus 101 notifies the user of an error and discards the image information of the read image at step S64, and terminates this series of steps.

As hereinabove descried, the multifunction apparatus 101 according to the second embodiment can attach the tag to the print material according to the user's request even where the user copies the print material to which the has not yet been attached. Thus, the multifunction apparatus 101 can prevent unauthorized copying of not only the print material printed with the tag but also any documents to which the tag has not yet been attached.

The multifunction apparatus 101 is capable of not only supervising copying of the print material but also supervising handling of the image information of the print material. Thus, the multifunction apparatus 101 can prevent leaking of confidential information caused by leaking of the image information.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. A multifunction system having plural processing functions, comprising:
   a printing apparatus having a printing unit that prints a combined image on a prescribed recording medium, the combined image being formed by combining an image based on image information with an output-restriction image selected from a group of output-restriction images having different shapes, each of the output-restriction images being assigned permission/prohibition information with regard to each of the plural processing functions and one of the output-restriction images having a particular shape;
   an image reading unit that reads, according to a reading instruction, the combined image printed on said prescribed recording medium;
   an image analyzer unit that analyzes the output-restriction image included in the combined image read out by said image reading unit; and
   an output determination unit that determines, on the basis of an analyzed result generated by said image analyzer unit, whether the image based on the image information can be output with respect to each of the plural processing functions, and
   a storage unit for storing output-restriction images in correspondence with permission/prohibition indicators of an output-restriction schedule,
   wherein each of the plural processing functions is selectively restricted based on the output-restriction image included in the combined image, and
   wherein the output determination unit obtains the permission/prohibition indicator corresponding to the analyzed output-restriction image to determine whether output is permitted and, if the analyzed output-restriction image has the particular shape, the output determination unit also obtains the current time and date for comparison with an output-restriction time and date included in the permission/prohibition indicators corresponding to the output-restriction image having the particular shape.

2. The multifunction system according to claim 1, wherein said reading apparatus further includes:
a restriction information retrieval unit that retrieves stored permission/prohibition information relating to the output-restriction image analyzed by said image analyzer unit; and
an image output unit that outputs, responsive to an output instruction provided by said output determination unit, an image based on the image information;
wherein said image output unit outputs the image based on the image information when the permission/prohibition information retrieved by said restriction information retrieval unit allows output of the image based on the image information.

3. The multifunction apparatus according to claim 1, wherein the processing functions include printing and at least one further processing function selected from the group consisting of e-mailing, faxing, and storing.

4. The multifunction system according to claim 2 further comprising:
a server apparatus connected to said reading apparatus,
wherein said reading apparatus further includes a result transmission unit that transmits to said server apparatus the analyzed result generated by said image analyzer unit,
wherein said server apparatus includes:
a memory unit that stores the permission/prohibition information and the output-restriction images
a comparison unit that compares the output restriction images stored in said memory unit with the analyzed result generated by said image analyzer unit and transmitted by said result transmission unit; and
a restriction information transmission unit that transmits to said restriction information retrieval unit the permission/prohibition information corresponding to the analyzed result according to a comparison result generated by said comparison unit, and
wherein said output determination unit determines, on the basis of the output-restriction information corresponding to the analyzed result transmitted from said restriction information transmission unit, whether the image based on the image information is allowed to be output.

5. A multifunction apparatus having plural processing functions, comprising:
a printing unit that prints a combined image on a prescribed recording medium, the combined image being formed by combining an image based on image information with an output-restriction image selected from a group of output-restriction images having different shapes, each of the output-restriction images being assigned permission/prohibition information with regard to each of the plural processing functions;
an image reading unit that reads, responsive to a reading instruction, the combined image printed on said prescribed recording medium;
an image analyzer unit that analyzes the output-restriction image included in the combined image read out by said image reading unit;
an output determination unit that determines, on the basis of an analyzed result generated by analysis by said image analyzer unit, whether the image based on the image information can be output with respect to each of the plural processing functions, and
a storage unit for storing output-restriction images in correspondence with permission/prohibition indicators of an output-restriction schedule,
wherein each of the plural processing functions is selectively restricted based on the output-restriction image included in the combined image, and
wherein the output determination unit obtains the permission/prohibition indicator corresponding to the analyzed output-restriction image to determine whether output is permitted.

6. The multifunction apparatus according to claim 5 further comprising:
a memory unit that stores the permission/prohibition information and the output-restriction images; and
a comparison unit that compares the output restriction images stored in said memory unit with the analyzed result generated by said image analyzer unit;
wherein said output determination unit determines, on the basis of the permission/prohibition information corresponding to the analyzed result, whether the image based on the image information is allowed to be output.

7. The multifunction apparatus according to claim 5 further comprising:
an information output determination unit that determines, instead of said output determination unit, whether the image based on the image information can be output according to the analyzed result generated by said image analyzer unit.

8. The multifunction apparatus according to claim 7 further comprising:
an image information unit that transmits to the outside the image information according to a determination result generated by said information output determination unit.

9. A copier for preventing unauthorized copying, the copier having plural processing functions, comprising:
a memory that stores a plurality of tag images and a plurality of permission/prohibition indicators each of which corresponds to a respective one of the plurality of tag images, the tag images having different shapes and one of the tag images having a particular shape;
an input unit that allows selection of one of the plurality of tag images;
a reading unit that reads a first image from a first medium;
a print unit that prints a second image on a second medium;
a judgment unit that judges whether said first medium is allowed to be copied;
wherein the plural processing functions are linked to the tag images;
wherein when said reading unit reads the first image from said first medium, said judgment unit judges whether the first image includes any one of the plurality of tag images,
wherein if said judgment unit determines that the first image includes none of the plurality of tag images, said judgment unit allows selection of one of the plurality of tag images and causes said print unit to print on said second medium a second image, which is made by combining the first image with said selected one of the plurality of tag images,
wherein if said judgment unit determines that the first image includes one of the tag images except said tag image having a predetermined shape, said judgment unit retrieves from said memory unit the permission/prohibition indicator corresponding to said one of the tag images, and allows or disallows said print unit to print the second image on said second medium depending on the permission/prohibition indicator retrieved from said memory unit, said second image being made of the first image including the any one of the plurality of tag images, and wherein if said judgment unit determines that the first image includes said tag image having the predetermined shape, said judgment unit retrieves from said memory unit the permission/prohibition indicator corresponding to said tag image having the predetermined shape and then compares a limited printing-permitted time period included in the permission/prohibition indicator corresponding to said tag image having a predetermined shape with the current time and date.

10. The copier according to claim 9, wherein if said judgment unit judges that the first image includes none of the plurality of tag images, said judgment unit causes said print unit to print the second image on said second medium only if a previously configured password is entered.

11. The copier according to claim 9, wherein said copier allows said print unit to print the second image on said second medium only during the printing-permitted time period if said judgment unit determines that the first image includes said tag image having the predetermined shape.

* * * * *